W. E. VOGES.
ELECTRIC LAWN CUTTER.
APPLICATION FILED SEPT. 4, 1919.

1,323,337.

Patented Dec. 2, 1919.
2 SHEETS—SHEET 1.

Inventor:
William E. Voges.
By John C. Higdon
Att'y.

W. E. VOGES.
ELECTRIC LAWN CUTTER.
APPLICATION FILED SEPT. 4, 1919.
1,323,337.
Patented Dec. 2, 1919.
2 SHEETS—SHEET 2.
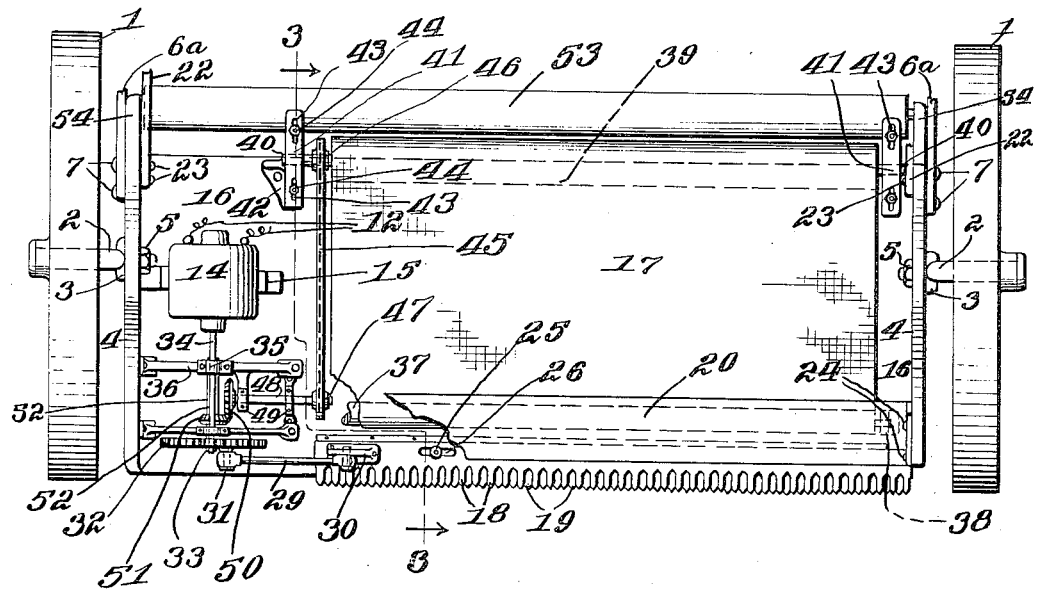
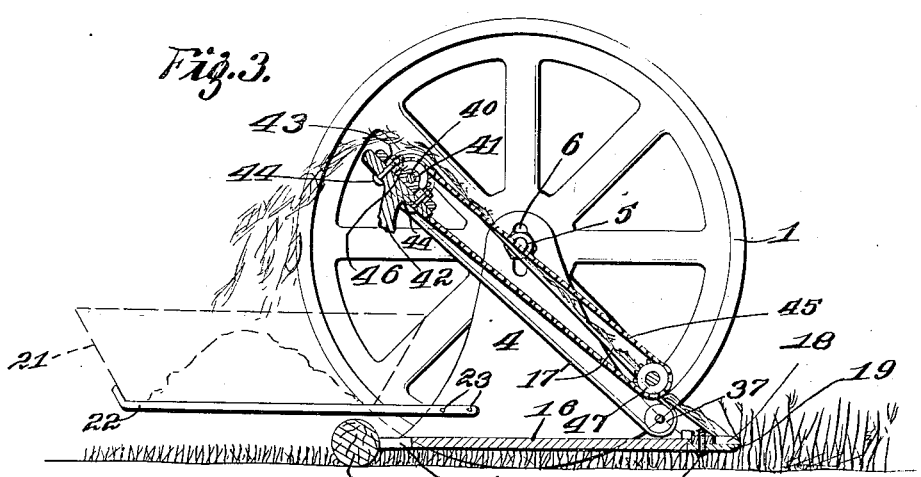
Inventor
William E. Voges.
by John C. Higdon
Att'y.

UNITED STATES PATENT OFFICE.

WILLIAM E. VOGES, OF ST. LOUIS, MISSOURI.

ELECTRIC LAWN-CUTTER.

1,323,337.  Specification of Letters Patent.  Patented Dec. 2, 1919.

Application filed September 4, 1919. Serial No. 321,525.

*To all whom it may concern:*

Be it known that I, WILLIAM E. VOGES, a citizen of the United States, residing at St. Louis, in the State of Missouri, have invented certain new and useful Improvements in Electric Lawn-Cutters, of which the following is a specification containing a full, clear, and exact description, reference being had to the accompanying drawings, forming a part hereof.

My invention consists in the novel construction and combination of parts hereinafter particularly described and distinctly claimed.

The object of my invention is to provide an improved electric lawn-cutter with a reciprocating toothed knife or cutter that is positively driven by an electric motor carried by the frame of the machine, and supplied with current from an external source through the medium of ordinary electric-light conductors and common lamp-sockets located at various positions throughout the lawn or field from which grass or weeds are to be cut, whereby the current may be obtained from sockets or plugs positioned as described, no matter how large the lawn or field may be.

A further object of my invention is to provide an electric lawn-cutting machine having a reciprocating toothed cutter, with an improved grass-elevating and conveying apron that shall be driven positively by the power of the electric or other form of motor which drives said cutter and is itself carried upon the frame of the machine.

In the drawings,

Fig. 2 is a top plan view of the machine, having the handle and other parts broken away, and Fig. 3 is a vertical cross-section, taken on the line 3—3 of Fig. 2.

Figure 1:
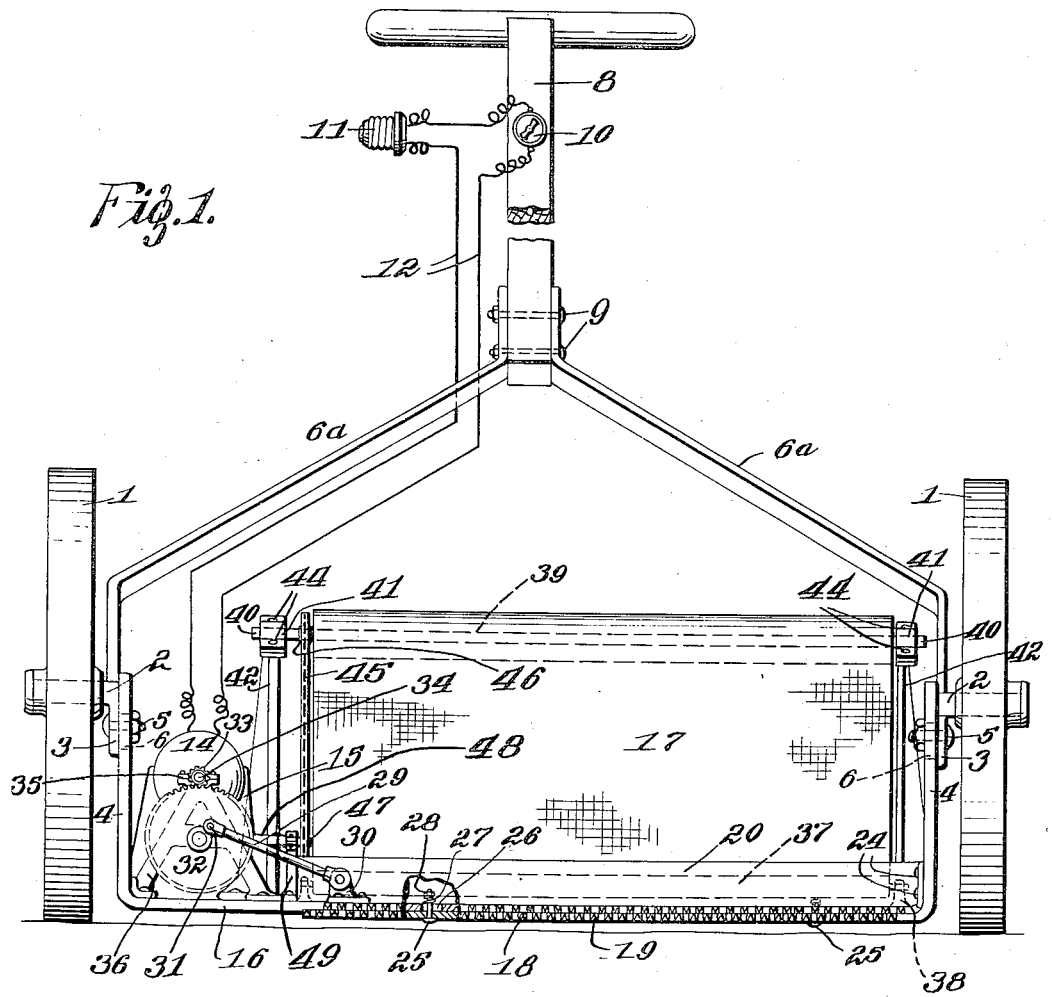
Figure 1 is a front view of the present form of a lawn-cutter embodying my invention.

In carrying out my invention I provide two large supporting-wheels 1, in order to make the machine easy to push, and these wheels are mounted upon axle-studs or pintles 2 having integral adjusting-brackets 3 clamped to the vertical end-plates 4 by means of bolts 5.

Said bolts 5 are adjustably mounted in vertical slots 6 in the said end-plates 4, whereby the frame of the machine can be raised or lowered, to cause the cutter to cut the grass or other material short or long. The usual handle-bail 6 is connected to the said end-plates by means of one or more bolts or rivets 7, and a common handle 8 is attached to the said handle-bail by means of bolts 9.

Mounted on the top surface of the said handle 8 at a point convenient for the operator is a common electric-switch 10 and an ordinary electric-lamp plug or socket 11, from which wires or conductors 12 lead to the electric-motor 14, which latter is mounted upon a suitable supporting-bracket 15 resting upon the horizontal frame-plate 16 which connects the said vertical end-plates 4 at the lower ends of the latter.

The said motor 14 is located in a space at one side of the machine, between the adjacent vertical end-plate 4 and the endless grass-carrier, which extends rearwardly and upwardly from a point closely adjacent the reciprocating cutter.

The numeral 17 designates the said endless grass-carrier, and the numeral 18 designates the said cutter.

The said cutter 18 is, in the present form of my invention, made of a steel bar having parallel teeth projecting from its front edge, and adapted to reciprocate above and in close contact with a series of like teeth 19 carried by the front edge of the said horizontal frame-plate 16, so that as the said cutter is reciprocated during the forward movement of the machine, the grass or weeds will be caught between the teeth of said cutter and said frame-plate, and cut the desired length from the ground, and the cut grass or weeds will fall backward upon a fixed inclined receiving-plate 20 and be thereby discharged upon the lower end of the said endless carrier 17, and be thereupon carried backward and upwardly, and discharged at the rear of the machine into a grass pan or basket 21 that is detachably supported by arms or a wire frame 22 connected to the said vertical end-plates 4 by means of screws or rivets 23.

The ends of the said receiving-plate 20 are bent or flanged, and are fixed to the said vertical end-plate 4, at one end by means of rivets or screws 24, and to some fixed part of the machine at the other end. (See Fig. 2.)

The said cutter 18 is held in yielding contact with the toothed portion of the said horizontal frame-plate 16 by means of bolts 25 passed through apertures in said frame-plate, and through slots 26 in said cutter, and coiled springs 27 mounted on said bolts above the said slots, said bolts having nuts 28 by means of which the pressure of said springs upon said cutter is regulated when required.

Motion is communicated to the cutter 18 by means of a pitman 29 connected at one end to a driving-bracket 30 fixed to the cutter near one end of the latter, the opposite end of said pitman being mounted on a crank-pin 31 fixed in a crank-disk 32.

Said crank-disk 32 is in the form of a gear-wheel having teeth which mesh with a pinion 33 fixed on the armature-shaft 34 of the said motor 14, the said shaft extending forward a sufficient distance, and being mounted in bearings 35 at the top of bearing-brackets 36 seated upon the said horizontal frame-plate 16, in the space between the said endless-carrier 17 and the adjacent vertical end-plate 4 of the machine frame.

The said endless-carrier 17 consists of a common belt or band, and suitable mountings therefor in the form of a bottom roll 37 having its pintles mounted in suitable bearing-brackets 38 fixed on the said horizontal frame-plate 16.

The upper end of said endless-carrier 17 is mounted upon a top-roll 39, whose pintles 40 are mounted in bearings 41 located at the upper ends of bearing-brackets 42 which rise from the said horizontal frame-plate 16.

Said bearings 41 of the said endless-carrier top-roll 39 are made adjustable by means of slots 43 in said bearings engaged by bolts 44, whereby the belt or band may be tightened or loosened whenever required.

Motion is communicated to the said endless-carrier 17 by a sprocket-chain 45, which is mounted upon a sprocket-wheel 46 fixed on the pintle 40 of the said top-roll 39, and runs upon another sprocket-wheel 47 fixed upon a short counter-shaft 48 that is mounted in bearing-brackets 49 and carries a bevel-gear 50 meshing with another bevel-gear 51 that is fixed upon the same shaft 52 which carries said crank-disk 32.

Said shaft 52 is mounted in bearings that are directly below the said bearings 35 of said armature shaft 34, on the said bearing-brackets 36, and the shaft 52 extends parallel with said armature-shaft, but in a plane below the latter, thereby communicating the power of said motor to the said endless-carrier.

The operation of my invention will be readily apparent from the above description, taken in connection with the drawings, except to state that there is a common ground roller 53 whose pintles are mounted in bearings 54 which project from the rear of the said vertical frame-plates 4, the function of said roller being to support the weight of the rear portion of the machine, and steady the same while it is being moved along upon the ground.

I claim:

1. An electric lawn-cutting machine, comprising a frame having a horizontal frame-plate, vertical end-plates at the ends of said horizontal plate, wheel-pintles or studs mounted on said end-plates near the upper ends of the latter, large supporting-wheels mounted upon said studs, to support said horizontal plate a distance from the ground, means for steadying the rear edge of said horizontal plate, a reciprocating cutter mounted at the front edge of said horizontal plate, an endless grass-carrier mounted in the rear of said cutter, to receive and carry upwardly and to the rear the cut grass or other material, a cut grass holding means in the rear of and beneath the elevated rear end of the said endless-carrier, an electric motor mounted in the space between said endless-carrier and one of the said vertical end-plates of the frame, suitable means for connecting the said endless-carrier to the said motor, to drive the carrier by the power of the said motor, a pitman connected to said cutter, and means connecting said pitman to said motor, to reciprocate the said cutter; in combination with means for connecting said motor to a suitable source of electricity.

2. An electric lawn-cutting machine constructed with a reciprocating cutter at its front, large supporting-wheels that adjustably hold the said cutter a distance above the ground, a frame supported at its front by said wheels only, a motor carried by said frame, and driving means connecting said cutter to said motor.

3. An electric lawn-cutting machine, comprising a suitable frame, a reciprocating-cutter mounted at the front of said frame, an inclined endless-carrier mounted in the rear of said cutter, to elevate the cut grass as it passes back of the said cutter, an electric motor mounted on said frame in the space between said endless-carrier and the adjacent end of said frame, means for connecting said endless-carrier to the said motor, and means for connecting said cutter to said motor.

In testimony whereof I have signed my name to this specification in presence of two subscribing witnesses.

WILLIAM E. VOGES.

Witnesses:
 HENRY E. LINK,
 JOHN C. HIGDON.